United States Patent
Blumenau (10) Patent No.: US 11,329,991 B2
(45) Date of Patent: May 10, 2022

(54) CONNECTIVITY SERVICE USING A BOUNCE BACK APPROACH

(71) Applicant: Google LLC, Mountain View, CA (US)

(72) Inventor: Steven M. Blumenau, Holliston, MA (US)

(73) Assignee: Google LLC, Mountain View, CA (US)

( * ) Notice: Subject to any disclaimer, the term of this patent is extended or adjusted under 35 U.S.C. 154(b) by 344 days.

(21) Appl. No.: 16/518,382

(22) Filed: Jul. 22, 2019

(65) Prior Publication Data

US 2020/0028855 A1    Jan. 23, 2020

Related U.S. Application Data (60) Provisional application No. 62/701,142, filed on Jul. 20, 2018.

(51) Int. Cl.
*H04L 29/06* (2006.01)
*G06F 21/60* (2013.01)

(52) U.S. Cl.
CPC .......... *H04L 63/108* (2013.01); *G06F 21/604* (2013.01); *H04L 63/102* (2013.01)

(58) Field of Classification Search
CPC ... H04L 63/108; H04L 63/102; H04L 63/083; G06F 21/604; G06F 21/45
See application file for complete search history.

(56) References Cited

U.S. PATENT DOCUMENTS

| | | | | |
|---|---|---|---|---|
| 10,114,664 | B1* | 10/2018 | Tripathy | G06F 9/45558 |
| 10,725,763 | B1* | 7/2020 | Chud | G06F 8/71 |
| 10,924,347 | B1* | 2/2021 | Narsian | H04L 41/0853 |
| 2004/0093399 | A1* | 5/2004 | Knebel | H04L 41/0663 709/221 |
| 2010/0306764 | A1* | 12/2010 | Khanna | G06F 9/45533 718/1 |
| 2013/0219481 | A1* | 8/2013 | Voltz | H04L 63/20 726/9 |
| 2014/0201736 | A1* | 7/2014 | Mizrahi | G06F 9/45558 718/1 |
| 2015/0081971 | A1* | 3/2015 | Mizuno | G06F 3/0611 711/114 |
| 2015/0215152 | A1* | 7/2015 | Caldwell | H04L 67/1095 709/202 |

(Continued)

*Primary Examiner* — Sanchit K Sarker
(74) *Attorney, Agent, or Firm* — Honigman LLP; Brett A. Krueger (57) ABSTRACT

Systems and methods for managing access to computing services include an access manager that receives a request to modify a configuration of a computing service to a new configuration. The access manger stores a previous configuration of the computing service, updates the configuration of the computing service from the previous configuration to the new configuration based on information representing the new configuration, and starts a service request timer for the computing service. The access manager receives a subsequent request. When the subsequent request is a reconnect request, the access manager deletes the stored previous configuration. When the subsequent request is not a reconnect request or a new request the access manager returns an error when the service request timer has not expired, or sets the configuration of the computing service to the previous configuration of the computing service when the timer has expired.

15 Claims, 8 Drawing Sheets

(56) References Cited

U.S. PATENT DOCUMENTS

2015/0358206 A1* 12/2015 Cudak ................... H04L 41/082
709/223
2020/0050517 A1* 2/2020 Haque ................. G06F 11/1469

* cited by examiner

CONNECTIVITY SERVICE USING A BOUNCE BACK APPROACH

FIELD

This application claims priority to U.S. Provisional Patent Application No. 62/701,142 entitled "CONNECTIVITY SERVICE USING A BOUNCE BACK APPROACH", filed Jul. 20, 2018, which is incorporated herein by reference in its entirety.

The subject matter disclosed in this application generally relates to gaining connectivity to a computer, virtual machine, container, or other compute facility.

BACKGROUND

Many compute facilities such as computers, virtual machines, or containers are communicated with over a network such as Ethernet. There are a number of attributes that are required to establish communication. Once the communication is established, there are further attributes needed to get past security systems such as a log in system. And finally, there are more attributes required to direct the communication to a specific application or service on the compute facility.

SUMMARY

An Access service with a bounce back approach solves the problem of misconfiguring either a network configuration or security configuration and completely losing access to a compute facility.

An issue that can occur is having an error in one of the attributes or security configurations which stops any communication from occurring. When this occurs, there is no ability to fix the problem. It typically requires physical access and as compute facilities has moved from physical computers to virtual machines and the virtual machines have moved into public networks, the ability to have physical access becomes harder to achieve.

When a security service is involved, such as a log in service, they are designed to keep access out unless one has the correct access, regardless of if one can connect to the compute facility over a network. When access is lost because of a misconfigured network attribute or security service, the virtual machine, for example, would have to be destroyed and new one started. This not only wastes time, but it can also waste tremendous cost and resources. The worst scenario would be losing access to a system that contains important data. With a physical machine, one could remove the hard drive and plug it into another compute facility and try to get access to the data. When using virtual machines, and especially virtual machines in public infrastructures, it can become impossible to get access to the data.

The Access Service with bounce back provides the ability to never have the above problem occur. The idea of "bounce back" is having the previous configuration restored which is like having the system "bounce back" to its previous configuration if the new configuration does not work.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims. It is to be understood that both the foregoing general description and the following detailed description are explanatory only and are not restrictive of the claimed subject matter.

The disclosed subject matter includes a method of managing access to computing services such that the computing services can be bounced back to a previous configuration of computing services. An access manager receives a request to modify a configuration of a computing service to a new configuration, the request including new value information representing the new configuration. The access manager determines that the request is a new request. The access manager updates the configuration of the computing service. The updating includes storing, by the access manager, a previous configuration of the computing service, causing to be updated, by the access manager, based on the information representing the new configuration, the configuration of the computing service from the previous configuration to the new configuration, and starting, by the access manager, a service request timer corresponding to the computing service. The access manager receives a subsequent request related to the configuration of the computing service. The access manager processes the subsequent request. Processing the subsequent request includes one of when the subsequent request is a reconnect request, deleting the stored previous configuration of the computing service, and when the subsequent request is not a reconnect request or a new request: returning an error when the service request timer corresponding to the computing service has not expired, or setting the configuration of the computing service to the previous configuration of the computing services when the timer corresponding to the computing service has expired, thereby allowing the computing services to bounce back to the previous configuration of computing services.

The disclosed subject matter includes a system for of managing access to computing services such that the computing services can be bounced back to a previous configuration of computing services. The system includes a content addressable store with a memory containing instructions for execution by a processor. The processor is configured to receive a request to modify a configuration of a computing service to a new configuration, the request including new value information representing the new configuration. The processor is configured to determine that the request is a new request. The processor is configured to update the configuration of the computing service. The update includes the processor configured to store a previous configuration of the computing service, cause to be updated based on the information representing the new configuration, the configuration of the computing service from the previous configuration to the new configuration, and start a service request timer corresponding to the computing service. The processor is configured to receive a subsequent request related to the configuration of the computing service. The processor is configured to process the subsequent request. Process the subsequent request includes processor further configured to one of when the subsequent request is a reconnect request, delete the stored previous configuration of the computing service, and when the subsequent request is not a reconnect request or a new request:

return an error when the service request timer corresponding to the computing service has not expired, or set the configuration of the computing service to the previous configuration of the computing services when the timer corresponding to the computing service has expired, thereby allowing the computing services to bounce back to the previous configuration of computing services.

The disclosed subject matter includes a non-transitory computer readable medium having executable instructions operable to cause an apparatus to perform the following steps. Receive a request to modify a configuration of a computing service to a new configuration, the request including new value information representing the new configuration. Determine that the request is a new request. Update the configuration of the computing service. The update includes store a previous configuration of the computing service, cause to be updated based on the information representing the new configuration, the configuration of the computing service from the previous configuration to the new configuration, and start a service request timer corresponding to the computing service. Receive a subsequent request related to the configuration of the computing service. The processor is configured to process the subsequent request. One of when the subsequent request is a reconnect request, delete the stored previous configuration of the computing service, and when the subsequent request is not a reconnect request or a new request: return an error when the service request timer corresponding to the computing service has not expired, or set the configuration of the computing service to the previous configuration of the computing services when the timer corresponding to the computing service has expired, thereby allowing the computing services to bounce back to the previous configuration of computing services.

In some embodiments the techniques described herein provide for determining that the request is a new request includes determining that an entry ID field of the request is unset.

In some embodiments the techniques described herein provide for updating the configuration of the computing services further including generating a new configuration ID for the request; setting an entry ID of the request to the new configuration ID; and setting previous value information of the request to a current configuration ID of the current configuration; and wherein storing the previous configuration of the computing services includes storing the information representing the request including information representing the entry ID of the request, the previous value information of the request, and the new value information of the request; and returning the request to a sender of the request. In some embodiments the techniques described herein further provide for determining that the subsequent request is a reconnect request includes determining that an entry ID field of the subsequent request is set, and that a previous value information and a new value information of the subsequent request are unset.

In some embodiments the techniques described herein provide for determining that the request is a new request further includes determining that a service module ID in the request is a known service module ID; and returning an error if the service module ID is not a known service module ID.

In some embodiments the techniques described herein provide for the configuration being one of a password, a username, a network configuration, or a security configuration.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

FIG. 5 illustrates an exemplary compute environment 500, such as a computer, virtual machine, or container, the access service 501 is an example of how the access service, FIG. 4, 400 is deployed, according to some embodiments;

DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Figure 1:
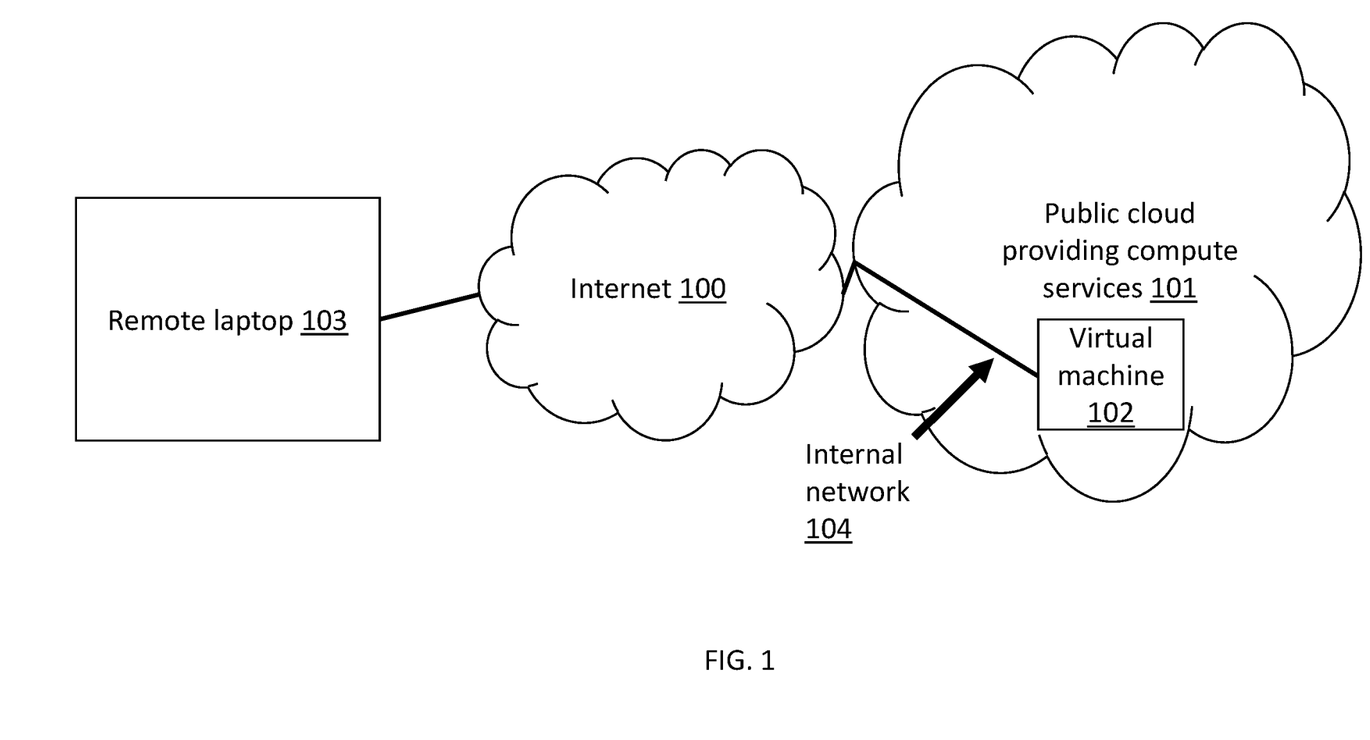
FIG. 1 illustrates an exemplary infrastructure of a virtual machine 102 executing in a remote public infrastructure 101 and a laptop 103 used to connect to it using the internet 100, according to some embodiments.

FIG. 1 illustrates an exemplary infrastructure of a virtual machine executing in a remote public infrastructure and a laptop used to connect to it, according to certain embodiments. There is a remote laptop computer 103 that can be used by a user. In certain embodiments, the remote laptop computer 103 connects to the internet 100 to communication with a public computing infrastructure called a cloud. This public cloud provides compute service 101 which supports executing virtual machine 102 via an internal network 104. A user using remote laptop 103 has a virtual machine 102 that is running in public cloud providing compute services 101. When the virtual machine 102 was created, the public cloud providing compute services assigned it an IP address (e.g., 201). An example of changing access would be to change the IP address (e.g., 201) of the virtual machine (e.g., 205).

Figure 2:
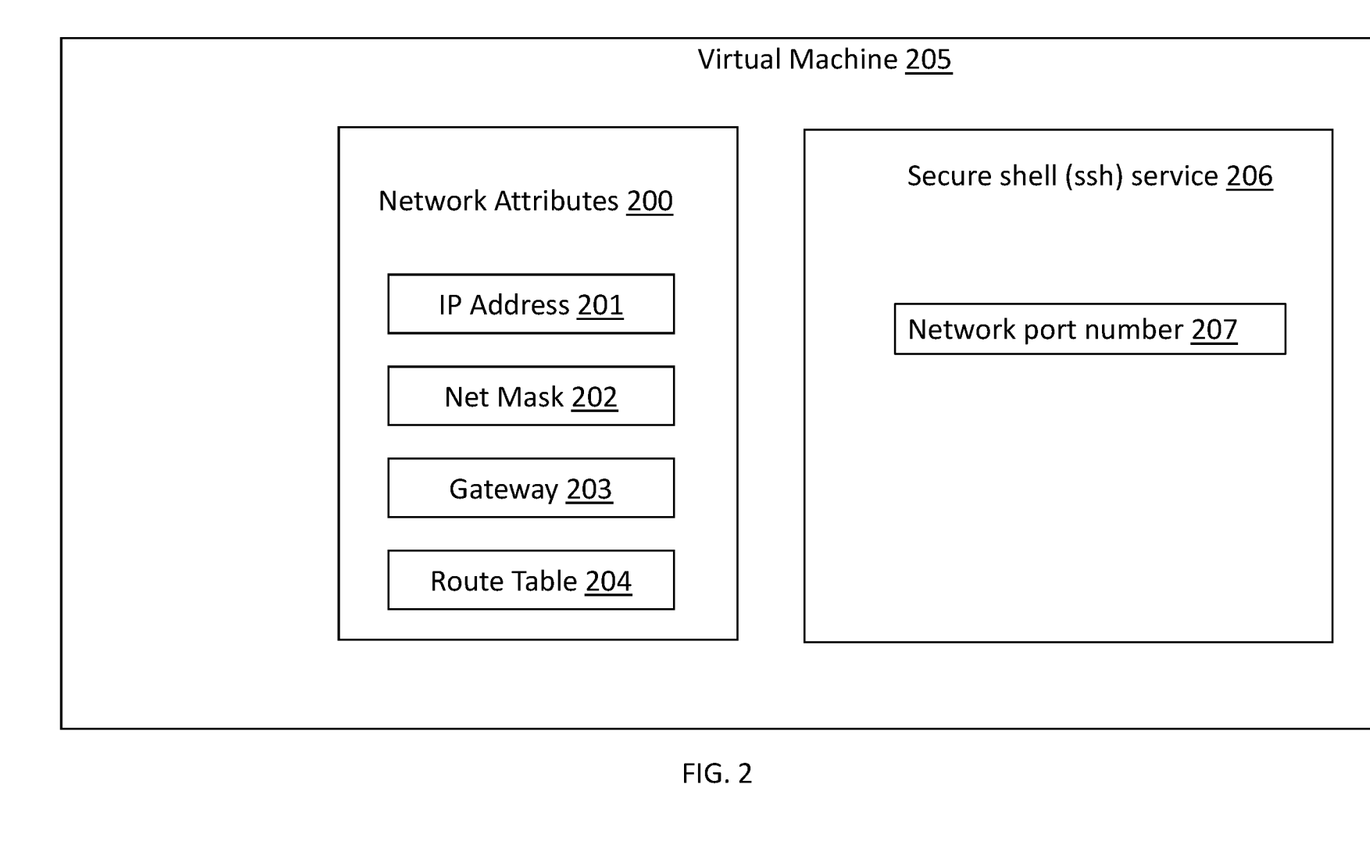
FIG. 2 illustrates an exemplary virtual machine 205 that includes network attributes 200 of IP address 201, net mask 202, gateway 203, and route table 204, and also includes a secure shell (ssh) service 206 which communicates on network port number 207, according to some embodiments.

FIG. 2 illustrates an exemplary virtual machine 205 that includes network attributes 200 of IP address 201, net mask 202, gateway 203, and route table 204, and also includes a secure shell (ssh) service 206 which communicates on network port number 207. FIG. 2 shows a smaller set of the possible network attributes and security attributes that can be modified in a compute facility like virtual machine 205. This smaller set was selected to show one example of the impact of a misconfiguration along with the execution of the access service (e.g., 400). In certain embodiments, the network attributes can also include DNS, for example, to handle a DHCP setup.

Figure 3:
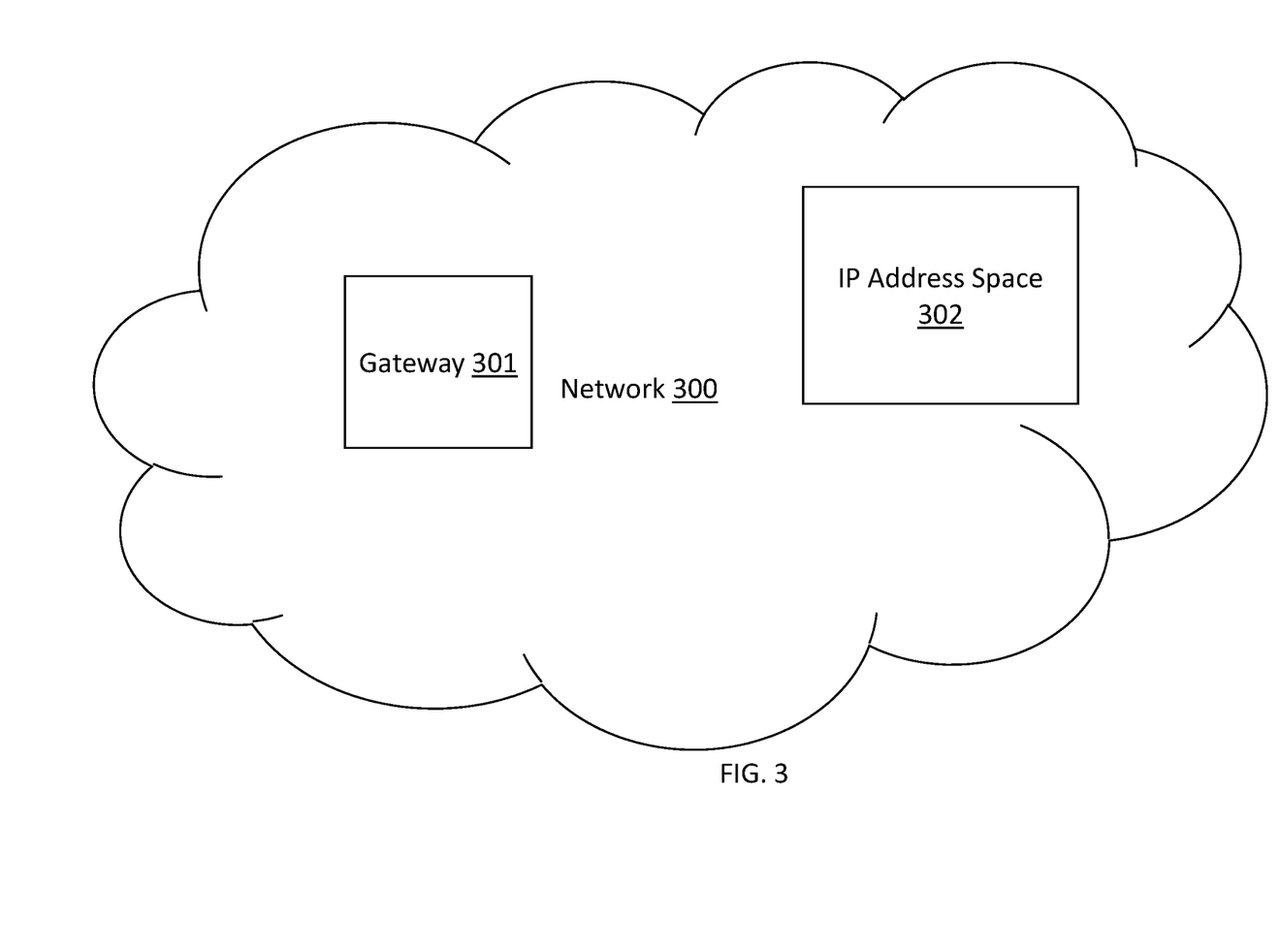
FIG. 3 illustrates an exemplary network 300 with attributes that enable a compute facility having IP Address Space 302 to communication using gateway 301, according to some embodiments.

FIG. 3 illustrates an exemplary network with attributes that enable a compute facility to communication. The network 300 has attributes of IP address space 302 and gateway 301. An address space is defined as the complete set of IP addresses (201), that could be used in the network 300. If the incorrect IP address is selected by mistake or mis-typing, the result could be that the virtual machine (205) would not be accessible to remote laptop (103). Using IPv4, the address space would be defined as 4 digits of 8 bits each which create a limit of a value of 255 for each digit. Along with that is a net mask (202), which defines which part of the address is variable. The IP address space 302 defines the total number of IP addresses (201) that can be used in network 300. Another important attribute is the gateway 301. This is an IP address that enables the virtual machine (205) to communicate with compute facilities outside of network 300.

If the IP address (201), net mask (202), gateway (203), or route table 204 are set incorrectly, the virtual machine (205) cannot to communicate on network 300 and remote laptop (103) cannot communication with virtual machine (205).

In virtual machine 205, there is a secure shell (ssh) service 206. The standard network port number 207 it uses to communicate is 22. The network port number 207 can be thought of as the network address for the software running on the virtual machine that has an IP address 201. A common security practice is to change the port address from the standard value of 22 to another number. This adds to the security because if the network port number 207 that secure shell (ssh) service 206 is communicating with is unknown, it would be hard to guess from outside the virtual machine 205.

As will be apparent to one of ordinary skill in the art, making a mistake changing any of these values may cause complete loss of access to virtual machine 205 from remote laptop 103.

Figure 4:
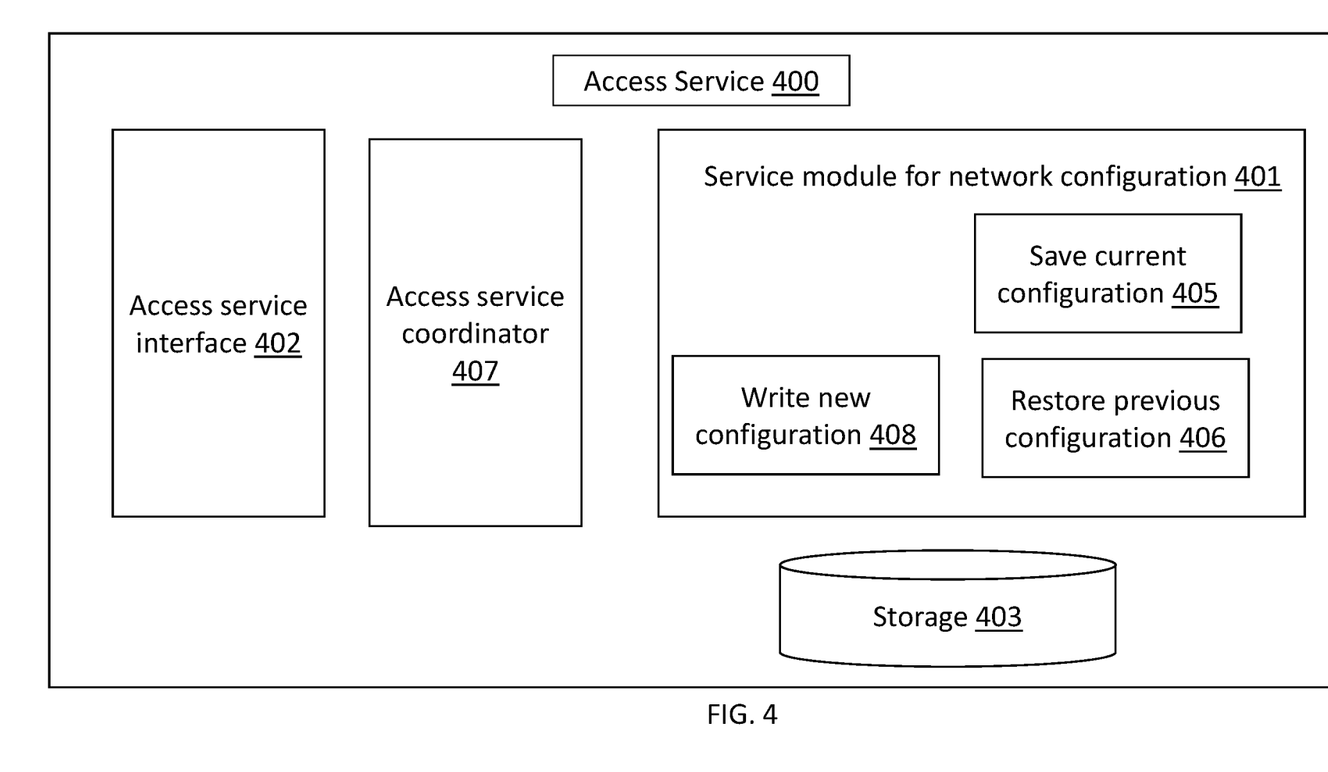
FIG. 4 illustrates an exemplary access service 400 along with the internal services 401, 402, 403, 404, 405 and 406, according to some embodiments.

FIG. 4 illustrates an exemplary access service 400 along with the internal services. The access service interface 402 is the point of communicating with the access service 400. This is used both for requesting a change to the access configuration and reconnecting afterward to prove the change was correct. There is a service module for network configuration 401. The service module 401 is dedicated code to allow support of the access service for a specialized operating system service. For example, as shown in FIG. 4, the service module 401 provides support for network configurations. In certain embodiments, a service module 401 could provide support for user credentials. In certain embodiments, a service module 401 could provide support for storage or other services. The network configuration 401 contains the services needed to support saving a network configuration 405 or bouncing back to the pervious configuration by restoring it 406. It also contains the service to write a new configuration 408. Storage 403 is need to keep track of access service 400 requests that could occur between reboots of the compute environment. The access service coordinator 407 manages the outstanding requests in storage 403 and decide which service needs to be called in each service module 401.

Figure 5:
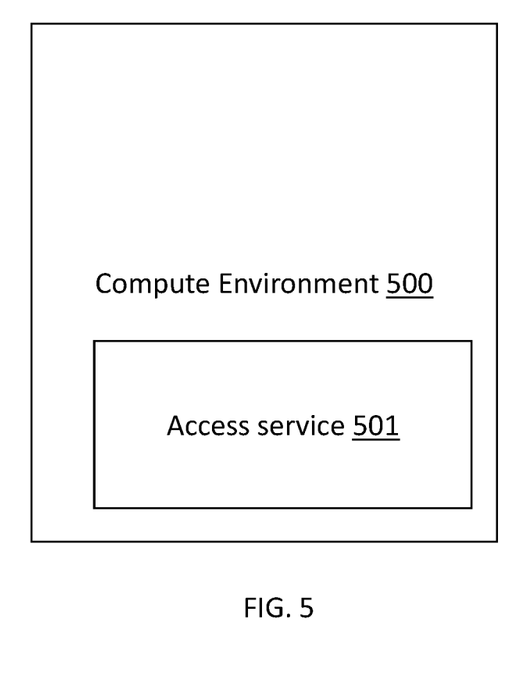

FIG. 5 illustrates an exemplary access service 501 that has been deployed inside the computer environment 500. The compute environment could be a computer, virtual machine, container or any other type of compute environment. In certain embodiments, the access service is uploaded to the compute environment via an SSH connection. Once the code is uploaded, execution is started using the ssh connection.

Figure 6:
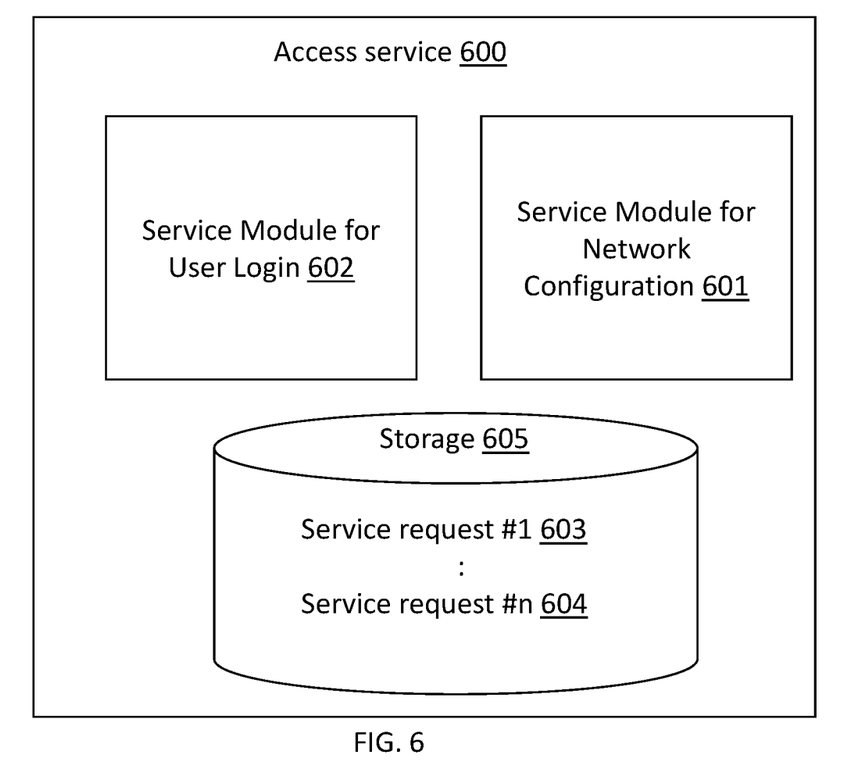
FIG. 6 illustrates an exemplary access service 600 that contains multiple service modules, such as a service module for user login 602 and a service module for network configuration 601, according to some embodiments.

FIG. 6 illustrates an exemplary access service 600 similar to access service 400 but with additional details regarding storage, according to certain embodiments. Access service 600 has multiple service modules showing how the full capability of the access service 600 may be extended, according to certain embodiments. There is a service module for user login 602. This allows one to request a change to a login password. There is also a service module for network configuration 601 which allows one to request a change to the network configuration, such as attributed 200 or port number 207. There is also Storage 605 (similar to storage 407) that holds configuration change requests persistent in case the compute environment reboots. In this example, storage 605 stores service request #1 603 in a list and the final entry service request #n 604. The storage 605 is managed by access service coordinator 407.

Figure 7:
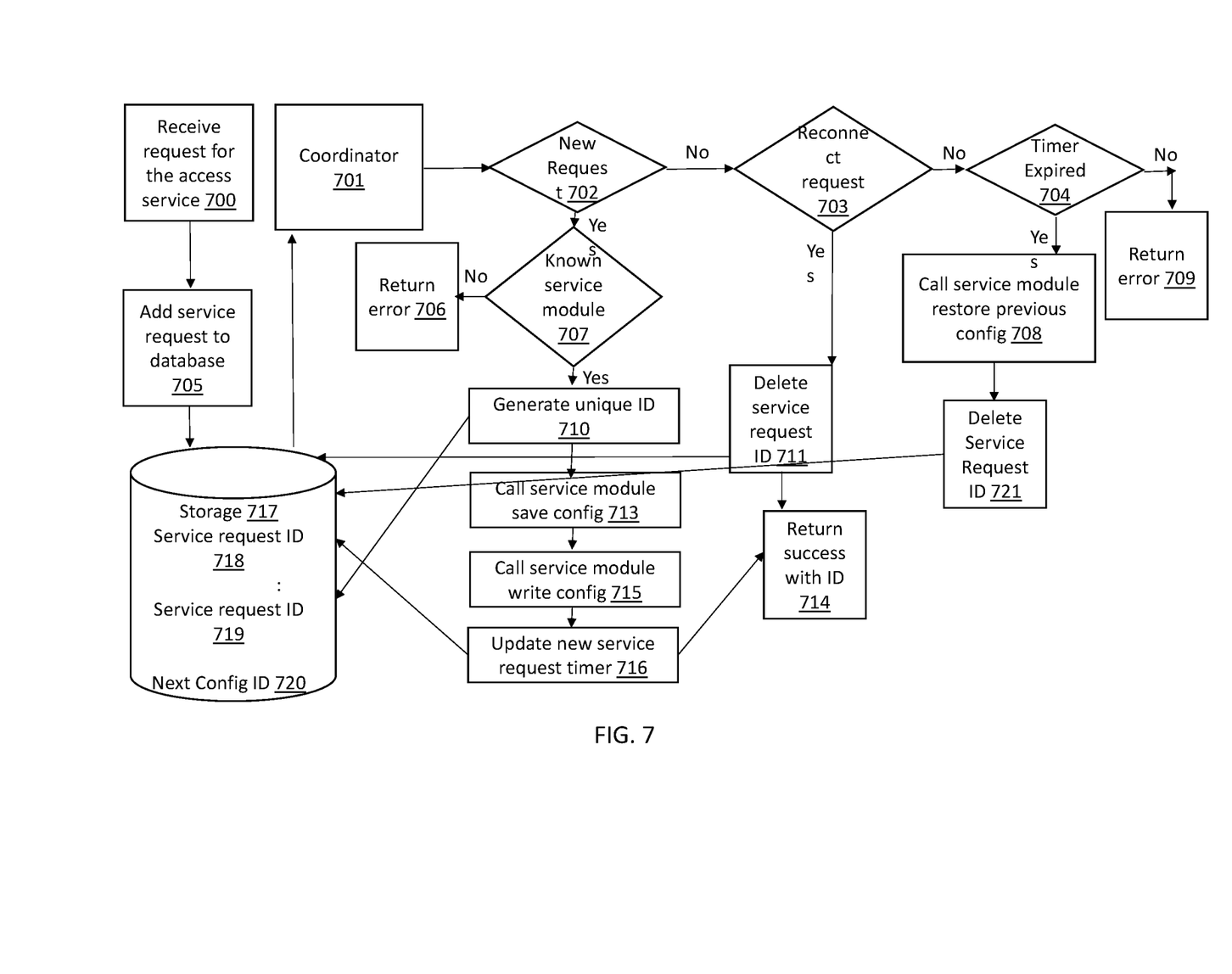
FIG. 7 illustrates an exemplary logic flow diagram showing operation receive request for access service 700, coordinator 701, new request 702 decision, request connect 703 decision, timer expired 704 decision, add service request to database 705 operation, return error 706 operation, known service module 707 decision, call service module restore previous config 708 operation, return error 709 operation, generate unique ID 710 operation, delete service request ID 711 operation, call service module save config 713 operation, return success with ID 714 operation, call service module write config 715 operation, update new service request 716 operation, storage 717, service request ID 718, service request ID 719, next config ID 720, and delete service request ID 721, according to some embodiments.

FIG. 7 shows the logic flow of the access service (such as access service 400 or access service 600), according to certain embodiments. In certain embodiments, a request is made to modify a characteristic of access, such as a password. In certain embodiments, there is a validation step to allow the user to change a password, network configuration, or other characteristic of access. For example, when access occurs over SSH as discussed above, SSH requires user credentials for access. The SSH connection fails if the credentials are not valid, preventing the ability to modify a characteristic of access. In certain embodiments, the access service uses other forms of validation such as other permission systems inside the target operating system environment. The access service 400, saves the current values of the specified characteristic, modify the system value for the characteristic, such as changing the password, and then setting a timer. Either a request is received to stop the timer which means access was achieved with the new value set for the characteristic, or the timer expires. If the timer expires, the saved previous value is saved as the current characteristic value, meaning resetting it to the original value. It is assumed by the design that if a request is not received to cancel the timer, the change made stopped access to the system. The solution is to set it back to the original values so another try can be done.

For example, according to certain embodiments, a systems may have a password timer that will force the user to change their password at a regular interval, such as once every three months. Because of how the systems may handle passwords, there is no way to recover a password. Instead, a user must go through a process to validate themselves as a user for the system to allow them to set a new password. Some systems may require the user to specify their old password to do so. Other systems do not have a method to validate the user to do password recovery. Thus, if the user forgets their password, the system administrator needs to reset the password using their privileged access. However, if the system administrator forgets their password, there may be no way to do password recovery.

In certain embodiments, the problem arises when the system forces the user to change their password. Since the actual characters of the password may be hidden from view, for example by using asterisk characters, the user does not receive any visual feedback that they typed new the password correctly. If the user saves a password that is typed incorrectly, they may not be able to guess the typo in their intended password. In certain embodiments, a system requires the user type the password twice, which lowers the chance that the user type incorrectly twice, and displays an error if the two entries don't match, requiring the user to re-enter the password. However, there is still the probability when typing quickly, the password is mis-type the same way twice. Once "save" is selected, the user is locked out of their account. In certain embodiments, systems immediately log the user out and force them to log back in to prove the password works. Other systems leave the user logged in to find out they don't know the password at a later time. When the user fails to be able to log in, they are stuck if the system does not provide password recovery.

In certain embodiments, the method described in FIG. 7 can be used to have the user reset a password (e.g., a new request) and set a timer for them to successfully log into the system (e.g., a reconnect request). If they cannot successfully log into the system, their previous password is restored. In certain embodiments, the system alerts the user that the old configuration or password is restored. This allows the user to login to the system and re-try setting the password correctly.

In FIG. 7, 700 is the operation where a request is received. In certain embodiments, the request has the format as shown in service request 800 in FIG. 8. This is also the format of the service request ID 718, 719 entry in storage 717. In certain embodiments, this is also the format that is sent back to the requestor in operations 706, 709, 721 and 714. This request is added by operation 705 to storage 717 using a well-known format of a list. New entries are added to the end of the list. FIG. 7, shows an example list of service requests identified by their ID as service request ID 718 and service request ID 719. Even though it is shown with 2 entries, there can be many entries in the list.

Figure 8:
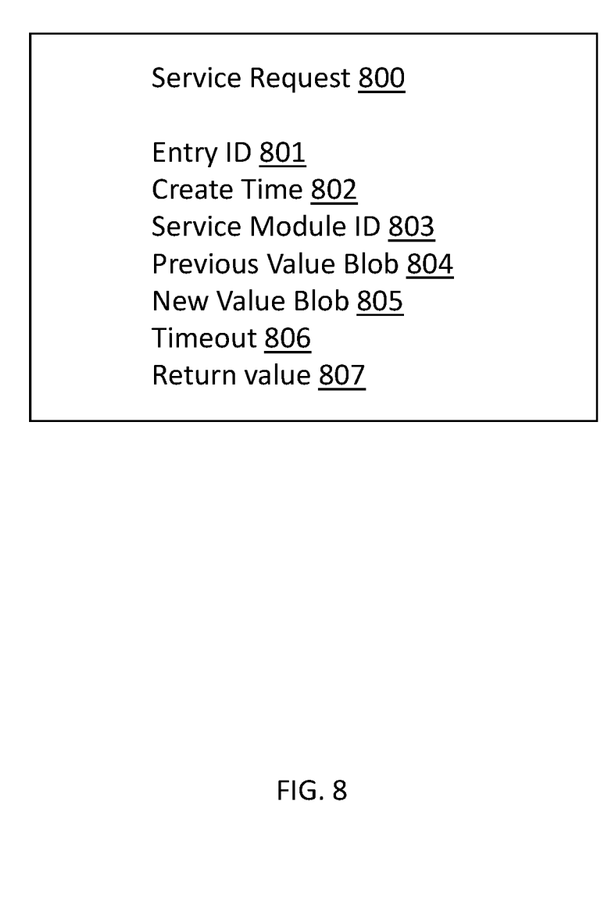
FIG. 8 illustrates an exemplary service request 800 which includes entry id 801, create time 802, service module id 803, previous value blob 804, new value blob 805, timeout 806, and return value 807, according to some embodiments.

FIG. 8 depicts service request 800, which has entry id 801, create time 802, service module id 803, previous value blob 804, new value blob 805, timeout 806, and return value 807, according to some embodiments. The entry ID 801 allows tracking entries over time. Create time 802 is set by the system when the entry is created, according to some embodiments. The service module ID 803 includes information identifying the network configuration, password, or other credential at issue, according to some embodiments. The previous value blob 804 holds information that has meaning to the service module, according to some embodiments. In certain embodiments, the previous value blob 804 is a binary large object that holds an array of binary data that only has meaning to the service module. In certain embodiments, the previous value blob 804 is set by the service module. In certain embodiments, such as if the information is sensitive, such as a password, the previous value blob can be encrypted. The new value blob 805 is the same as the previous value blob 804, except that it includes the arguments passed in the service request 800. For example, the new value blob 805 is a new password or network configuration, and the previous value blob 804 is an old password or network configuration. The timeout 806 is set to the time that the system waits before the service module resets the value using the previous value blob 804, according to some embodiments. In certain embodiments, the timeout is recorded in seconds. The return value 807 is filled by the service module when returning the service request to the user, according to some embodiments.

When requests are received by receive request for access service 700, it is passed to the add service request to database 705 operation. In certain embodiments, service request 800, structure, the return value is only set when sending back to the requestor. If this is a new request 702, entry ID 801, create time 802, previous value blob 804 is unset. Operation 705 is written the new entry into storage 717. It sets the create time 802 and write the service module ID 803 and new value blob 805 fields into the new entry in the storage. If this is a reconnect request 703, entry ID 801 is set to the value that was previously returned. Create time 802, service module ID 803, previous value blob 804 and new value blob 805 are unset. Operation 705 unsets the previous value blob 804 and new value blob 805 which indicates to the coordinator 701, that this is a reconnect request.

FIG. 7, 701, is the coordinator operation. It reads each service request ID 718, 719 entry and decide what needs to be done with the entry. After processing each entry, it then sleeps for period that is settable and defaults to, for example, 60 seconds. This means that the coordinator processes each entry and then sleep for, as an example, 60 seconds. After the sleep ends, it processes the list again. This continues until the access service is ended.

In certain embodiments, a service request can be a new request or a reconnect request. A new request is the first time any request has been made. The entry ID (such as entry ID 801) is blank. A reconnect request occurs, for example, when a user performs some action such as logging in. The reconnect request includes an entry ID (such as entry ID 801), which identifies the request as a reconnect request. In certain embodiments, the reconnect request tells the system that the modified configuration from the new request was successful and to cancel the timer and leave the new configuration in place.

According to FIG. 7, when the service request ID 718, 719 entry is read, there are three decisions that can be made regarding the entry. If the entry ID 801 is unset, then this is a new request 702. If the entry ID is set and the previous value blob 804 and new value blob 805 are unset, then this is considered a reconnect request 703 (e.g., to tell the access service that the user has successfully connected to the system with the new password or network configuration). If the request is neither a new request nor a reconnect request, such as if the entry ID 801 is set and previous value blob 804 and new value blob 805 are set, then the system checks to see if the timer expired in decision 704. In certain embodiments, unlike a new request or a reconnect request, which are generated based on user actions, a request with entry ID 801 set and previous value blob 804 and new value blob 805 set is a system generated event that occurs when the timer expires. For example, the system may automatically generate the event when a service request timer expires as a way to indicate that that the system should bounce back to a previous configuration (e.g., password or network configuration). In certain embodiments, the timer is checked by adding the timeout 806 value to the create time 802 value and if the current time is greater than the sum of timeout 806 and create time 802, it is considered a timer expired 704 condition. In certain embodiments, if none of these criteria 702, 703, or 704 are met, an error is returned 709 by unsetting the previous value blob 804 and setting the return value 807 and then sending the request back to the requestor. In certain embodiments, it is important that the previous value blob be cleared so no confidential information is returned in the error indicator, such as the previous password value.

If timer expired 704 decision is yes, the call service module restore previous config 708 is executed. This calls restore previous configuration service 406 from the service module 402. Service module ID 803 is used to decide which service module to call as shown in FIGS. 6, 602 and 601. After restoring the previous value from the previous value blob 804, the service request ID 718, 719, entry is deleted from storage 717 by delete service request ID 721 operation. In certain embodiments, when this is complete, no other work is done. That is, in certain embodiments, there is no return value to the requestor because it is assumed they would not able to reconnect.

If the reconnect request 703 decision is yes, the service request ID 718, 719 is deleted from storage 717 by the delete service request ID 711 operation. When this is complete, a service request 800 structure is return to the requestor with all fields unset except for the return value 807 set to success by the return success ID 714 operation. For example, a return value 807 is sent to the requesting software to inform it that the timer has been canceled.

If the new request 702 decision is yes, the coordinator 701 checks if the service module ID 803 is a known service module value in decision 707. For example, the service module ID 803 is a known service module if a network configuration (e.g., 401) exists for the service module. In certain embodiments, service modules are only known if they are built into the software. If it is not, a service request 800 structure is returned to the requestor with all fields unset except for the return value 807 set to error by the return error ID 706 operation. If the known service module 707 decision is yes, it generates a unique ID 710 for the service request.

This is done by reading the next config ID 720 value from the storage 717. That value is set to the entry ID 801. The value is then incremented by a value of 1 and written back to the next config ID 720 field in the storage 717. Using the service module ID 803, the service module save config 713 operation calls the correct service module (602 or 601), save current configuration 405. This operation saves the current configuration value into previous value blob 804. The format of the field is set by the specific save current configuration 405 that was called. It could be different for different service modules such as 601 and 602. Once the current value is saved into the previous value blob 804, the service module write configuration 715 calls the write new configuration 408 in the correct service module 601, 602 using the service module ID 803. The final set is to set the create time 802 and update the service request ID 718, 719 entry in storage 717. When this is complete, a service request 800 structure is returned to the requestor with all fields unset except for the entry ID 801 assigned and the return value 807 set to success by the return success ID 714 operation.

Using the described access service (600), one would have confidence making changes to compute environments such as computers, virtual machines and containers, knowing that they will never lose access to them because of incorrect access configurations being set.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor receives instructions and data from a read only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method of managing access to computing services such that the computing services can be bounced back to a previous configuration of computing services, the method comprising:
   receiving, by an access manager, a request to modify a configuration of a computing service to a new configuration, the request including new value information representing the new configuration;
   determining, by the access manager, that the request is a new request by:
      determining whether a service module identification (ID) in the request is a known service module ID;
      when the service module ID in the request is a known service module ID, generating a new configuration ID for the new request; and
      when the service module ID in the request is not a known service module ID, returning an error;
   when the request is the new request, updating, by the access manager, the configuration of the computing service by:
      storing a previous configuration of the computing service;
      causing to be updated, based on the new value information representing the new configuration, the configuration of the computing service from the previous configuration to the new configuration; and
      starting, by the access manager, a service request timer corresponding to the computing service;
   receiving, by the access manager, a subsequent request related to the configuration of the computing service; and
   processing, by the access manager, the subsequent request, wherein processing the subsequent request comprises one of:
      when the subsequent request is a reconnect request, deleting the stored previous configuration of the computing service; or
      when the subsequent request is not a reconnect request or a new request:
      returning an error when the service request timer corresponding to the computing service has not expired; or
      setting the configuration of the computing service to the previous configuration of the computing service when the service request timer corresponding to the computing service has expired, thereby allowing the computing service to bounce back to the previous configuration of computing service.

2. The method of claim 1, wherein determining that the request is a new request comprises determining that an entry ID field of the request is unset.

3. The method of claim 1, wherein updating the configuration of the computing service further comprises:
   setting, by the access manager, an entry ID of the request to the new configuration ID; and
   setting, by the access manager, previous value information of the request to a current configuration ID of the current configuration,
   wherein causing to be updated, by the access manager, the previous configuration of the computing service comprises:
      storing information representing the request including information representing the entry ID of the request, the previous value information of the request, and the new value information of the request; and
      returning the request to a sender of the request.

4. The method of claim 1, wherein determining that the subsequent request is a reconnect request comprises:
   determining that an entry ID field of the subsequent request is set; and
   determining that a previous value information and a new value information of the subsequent request are unset.

5. The method of claim 1, wherein the configuration comprises one of a password, a username, a network configuration, or a security configuration.

6. A system for of managing access to computing services such that the computing services can be bounced back to a previous configuration of computing services, the system comprising:
   a content addressable store comprising a memory containing instructions for execution by a processor, the processor configured to:
   receive a request to modify a configuration of a computing service to a new configuration, the request including new value information representing the new configuration;
   determine that the request is a new request by:
      determining whether a service module identification (ID) in the request is a known service module ID;

when the service module ID in the request is a known service module ID, generating a new configuration ID for the new request; and
when the service module ID in the request is not a known service module ID, returning an error;
when the request is the new request, update the configuration of the computing service, the update further comprising the processor further configured to:
store a previous configuration of the computing service;
cause to be updated based on the new value information representing the new configuration, the configuration of the computing service from the previous configuration to the new configuration; and
start a service request timer corresponding to the computing service;
receive a subsequent request related to the configuration of the computing service; and
process the subsequent request, wherein process the subsequent request further comprises the processor further configured to one of:
when the subsequent request is a reconnect request, delete the stored previous configuration of the computing service; or
when the subsequent request is not a reconnect request or a new request:
return an error when the service request timer corresponding to the computing service has not expired; or
set the configuration of the computing service to the previous configuration of the computing service when the service request timer corresponding to the computing service has expired, thereby allowing the computing service to bounce back to the previous configuration of computing service.

7. The system of claim 6, wherein determine that the request is a new request further comprises the processor further configured to determine that an entry ID field of the request is unset.

8. The system of claim 6, wherein update the configuration of the computing service further comprises the processor further configured to:
set an entry ID of the request to the new configuration ID; and
set previous value information of the request to a current configuration ID of the current configuration,
wherein cause to be updated the previous configuration of the computing service further comprises the processor further configured to:
store information representing the request including information representing the entry ID of the request, the previous value information of the request, and the new value information of the request; and
return the request to a sender of the request.

9. The system of claim 6, wherein determine that the subsequent request is a reconnect request further comprises the processor further configured to:
determine that an entry ID field of the subsequent request is set; and
determine that a previous value information and a new value information of the subsequent request are unset.

10. The system of claim 6, wherein the configuration comprises one of a password, a username, a network configuration, or a security configuration.

11. A non-transitory computer readable medium having executable instructions operable to cause an apparatus to:
receive a request to modify a configuration of a computing service to a new configuration, the request including new value information representing the new configuration;
determine that the request is a new request by:
determining whether a service module identification (ID) in the request is a known service module ID;
when the service module ID in the request is a known service module ID, generating a new configuration ID for the new request; and
when the service module ID in the request is not a known service module ID, returning an error;
when the request is the new request, update the configuration of the computing service, the update further comprising the apparatus further configured to:
store a previous configuration of the computing service,
cause to be updated based on the new value information representing the new configuration, the configuration of the computing service from the previous configuration to the new configuration, and
start a service request timer corresponding to the computing service;
receive a subsequent request related to the configuration of the computing service; and
process the subsequent request, wherein process the subsequent request further comprises one of:
when the subsequent request is a reconnect request, delete the stored previous configuration of the computing service; or
when the subsequent request is not a reconnect request or a new request:
return an error when the service request timer corresponding to the computing service has not expired, or
set the configuration of the computing service to the previous configuration of the computing service when the service request timer corresponding to the computing service has expired, thereby allowing the computing service to bounce back to the previous configuration of computing service.

12. The non-transitory computer readable medium of claim 11, wherein determine that the request is a new request further comprises determine that an entry ID field of the request is unset.

13. The non-transitory computer readable medium of claim 11, wherein update the configuration of the computing service further comprises:
set an entry ID of the request to the new configuration ID; and
set previous value information of the request to a current configuration ID of the current configuration,
wherein cause to be updated the previous configuration of the computing service further comprises:
store information representing the request including information representing the entry ID of the request, the previous value information of the request, and the new value information of the request; and
return the request to a sender of the request.

14. The non-transitory computer readable medium of claim 11, wherein determine that the subsequent request is a reconnect request further comprises:
determine that an entry ID field of the subsequent request is set; and
determine that a previous value information and a new value information of the subsequent request are unset.

15. The non-transitory computer readable medium of claim 11, wherein the configuration comprises one of a password, a username, a network configuration, or a security configuration.

* * * * *